(12) United States Patent
Paternoster et al.

(10) Patent No.: US 11,273,600 B2
(45) Date of Patent: Mar. 15, 2022

(54) METHOD AND DEVICE FOR A GENERATIVE MANUFACTURING OF A THREE-DIMENSIONAL OBJECT

(71) Applicant: EOS GmbH Electro Optical Systems, Krailling (DE)

(72) Inventors: Stefan Paternoster, Andechs (DE); Stefan Grünberger, Munich (DE); Peter Keller, Krailling (DE)

(73) Assignee: EOS GmbH Electro Optical Systems, Krailling (DE)

( * ) Notice: Subject to any disclaimer, the term of this patent is extended or adjusted under 35 U.S.C. 154(b) by 0 days.

(21) Appl. No.: 16/079,154

(22) PCT Filed: Mar. 1, 2017

(86) PCT No.: PCT/EP2017/054777
§ 371 (c)(1),
(2) Date: Aug. 23, 2018

(87) PCT Pub. No.: WO2017/149014
PCT Pub. Date: Sep. 8, 2017

(65) Prior Publication Data
US 2019/0084227 A1    Mar. 21, 2019

(30) Foreign Application Priority Data

Mar. 3, 2016    (DE) .......................... 102016203556.8

(51) Int. Cl.
*B29C 64/218* (2017.01)
*B33Y 10/00* (2015.01)
(Continued)

(52) U.S. Cl.
CPC ............ *B29C 64/218* (2017.08); *B22F 10/20* (2021.01); *B28B 1/001* (2013.01);
(Continued)

(58) Field of Classification Search
CPC ... B29C 64/218; B29C 64/214; B29C 64/393; B29C 64/153; B33Y 50/02; B33Y 10/00;
(Continued)

(56) References Cited

U.S. PATENT DOCUMENTS 6,531,086 B1 *   3/2003   Larsson ................ B29C 64/153
                                                          264/497
6,767,499 B1     7/2004   Hory et al.
(Continued)

FOREIGN PATENT DOCUMENTS

CN    1500608    6/2004
CN    1648802    8/2005
(Continued)

OTHER PUBLICATIONS

International Search Report for Application No. PCT/EP2017/054777 dated May 18, 2017, 16 pages.
(Continued)

*Primary Examiner* — Nahida Sultana
(74) *Attorney, Agent, or Firm* — Seyfarth Shaw LLP

(57) ABSTRACT

A manufacturing method for generatively manufacturing a three-dimensional object by a layer-by-layer application and selective solidification of a building material includes applying a layer of the building material within a build area by means of a recoater moving in a recoating direction across the build area, selectively solidifying the applied layer of the building material at points corresponding to a cross-section of the object to be manufactured by means of a solidification device, and repeating the steps of applying and solidifying until the three-dimensional object is completed. A local action confined to a region between the recoating unit moving across the build area and the solidification device
(Continued)

and/or compaction device moving behind the recoating unit across the build area is performed on the applied layer of the building material.

21 Claims, 4 Drawing Sheets

(51) Int. Cl.
  *B33Y 30/00*   (2015.01)
  *B29C 64/153*   (2017.01)
  *B29C 64/214*   (2017.01)
  *B22F 10/20*   (2021.01)
  *B33Y 50/02*   (2015.01)
  *B29C 64/393*   (2017.01)
  *B28B 1/00*   (2006.01)
  *B28B 17/00*   (2006.01)
  *B22F 10/30*   (2021.01)

(52) U.S. Cl.
  CPC ........ *B28B 17/0081* (2013.01); *B29C 64/153* (2017.08); *B29C 64/214* (2017.08); *B29C 64/393* (2017.08); *B33Y 10/00* (2014.12); *B33Y 30/00* (2014.12); *B33Y 50/02* (2014.12); *B22F 10/30* (2021.01)

(58) Field of Classification Search
  CPC ............... B33Y 30/00; B22F 3/1055; B22F 2003/1057; B28B 1/001; B28B 17/0081
  See application file for complete search history.

(56) References Cited

U.S. PATENT DOCUMENTS

| | | | | |
|---|---|---|---|---|
| 8,096,262 | B2* | 1/2012 | Ederer | .................... B29C 41/12 118/308 |
| 10,668,533 | B2* | 6/2020 | Ng | ........................ B22F 3/1055 |
| 2004/0137228 | A1* | 7/2004 | Monsheimer | .......... B33Y 10/00 428/402 |
| 2004/0170765 | A1* | 9/2004 | Ederer | ................... B33Y 40/00 427/355 |
| 2007/0238056 | A1 | 10/2007 | Baumann et al. | |
| 2009/0206522 | A1* | 8/2009 | Hein | ..................... B29C 64/153 264/497 |
| 2012/0201960 | A1 | 8/2012 | Hartmann et al. | |
| 2014/0175708 | A1 | 6/2014 | Echigo et al. | |
| 2014/0363585 | A1 | 12/2014 | Pialot et al. | |
| 2015/0202826 | A1* | 7/2015 | Paternoster | ........... B29C 64/386 428/474.7 |
| 2015/0251250 | A1 | 9/2015 | Schlick et al. | |
| 2015/0266239 | A1 | 9/2015 | Okamoto et al. | |
| 2017/0304895 | A1* | 10/2017 | Porch | ................... B23K 26/342 |

FOREIGN PATENT DOCUMENTS

| | | |
|---|---|---|
| CN | 102596544 | 7/2012 |
| CN | 204135334 | 2/2015 |
| CN | 2041135334 | 2/2015 |
| CN | 104890241 | 9/2015 |
| DE | 102004020452 | 12/2005 |
| DE | 102012212587 | 1/2014 |
| DE | 102013226670 | 6/2014 |
| EP | 1058675 | 9/2003 |
| EP | 2859973 | 4/2015 |
| EP | 2915611 | 9/2015 |
| WO | 2014184117 | 11/2014 |

OTHER PUBLICATIONS

Chinese Search Report for Application No. 201780025191.9 dated May 14, 2020, 2 pages.

* cited by examiner

METHOD AND DEVICE FOR A GENERATIVE MANUFACTURING OF A THREE-DIMENSIONAL OBJECT

TECHNICAL FIELD OF THE INVENTION

The present invention relates to a device and a method for generatively manufacturing a three-dimensional object by a layer-by-layer application and selective solidification of a building material, preferably a powder.

BACKGROUND OF THE INVENTION

Devices and methods of this type are, for instance, used in Rapid Prototyping, Rapid Tooling, or Additive Manufacturing. An example of such a method is known as the "selective laser sintering or melting". In the course of this, a thin layer of a building material in powder form is repeatedly applied, and the building material in each layer is selectively solidified by selectively irradiating it using a laser beam.

It is known from EP 1 058 675 B1 to compact a powder layer applied by means of a blade by means of a roller when laser sintering ceramic powder. Thereby, the time required during the sintering in the solid phase of the ceramic powder is to be reduced.

It is the object of the present invention to provide an alternative or, respectively, improved device or, respectively, an alternative or, respectively, improved method for generatively manufacturing a three-dimensional object by a layer-by-layer application and selective solidification of a building material, wherein, in particular, preferably the layer application is improved.

SUMMARY OF THE INVENTION

This object is achieved by a manufacturing method, a control device, and a manufacturing device as disclosed in the present application. In the course of this, the method may also be further developed by the features of the devices provided below or vice versa, or, respectively, the features of the devices may also be respectively used among themselves for a further development.

The manufacturing method according to the invention serves to generatively manufacture a three-dimensional object by a layer-by-layer application and selective solidification of a building material, preferably a powder. It comprises the steps of applying a layer of the building material within the build area by means of a recoater moving in a recoating direction across the build area, selectively solidifying the applied layer of the building material at points corresponding to a cross-section of the object to be manufactured by means of a solidification device, and repeating the steps of applying and solidifying until the three-dimensional object is completed. The solidification device and/or a compaction device moves behind the recoater in the recoating direction across the build area. A local action confined to a region between the recoater moving across the build area and the solidification device and/or compaction device moving behind the recoater across the build area is performed on the applied layer of the building material. Thereby, for instance, the properties of the applied layer of the building material can be changed prior to the compaction and/or prior to the solidification in a manner advantageous for the manufacturing process.

Preferably, the application of the layer of the building material by means of the recoater comprises drawing out the applied building material to a layer according to predetermined criteria concerning an areal extent and/or thickness and/or surface property and/or density of the layer. Such a purposeful shaping of the layer of the building material provides the advantage that a subsequent solidification of the building material can be carried out under controlled conditions. This can aid a high piece part quality and a reproducibility of the manufacturing process.

Preferably, the locally confined action on the applied layer of the building material comprises a local heating. Thereby, for instance, a faster reaching of the desired working temperature and a more accurate adjustment of the layer thickness can be effected.

Preferably, the local heating is carried out by means of induction and/or radiation. Thereby, for instance, a local heating can be carried out using simple means.

Preferably, the locally confined action on the applied layer of the building material comprises introducing an absorbing agent and/or an inhibiting agent into the building material layer, wherein the absorbing agent and/or inhibiting agent is preferably liquid, paste-like, and/or solid and/or contains hollow particles filled with a liquid or paste. Thereby, for instance, a selective solidification can also be carried out using a non-selective irradiation.

Preferably, the locally confined action on the applied layer of the building material comprises pre-irradiating. Thereby, for instance, a first sintering-on or a chemical reaction can be effected in the building material.

Preferably, the locally confined action on the applied layer of the building material comprises charging the layer with a fluid at least surface-actively interacting with at least one constituent of the building material. Thereby, for instance, the fluid can permeate the powder layer better than after the compaction.

Preferably, the locally confined action on the applied layer of the building material comprises at least partially removing at least one constituent of the building material layer. Thereby, for instance, the building material can be applied as a paste, from which a suspending agent or a solvent is subsequently removed.

The computer program according to the invention is loadable into a programmable control unit and comprises program code means in order to perform all steps of the method according to the invention when the computer program is executed in the control unit. Thereby, for instance, the method according to the invention can be controlled by means of a computer program.

The control device according to the invention is provided for a manufacturing device for generatively manufacturing a three-dimensional object by a layer-by-layer application and selective solidification of a building material. The manufacturing device comprises a recoater movable in a recoating direction across a build area for applying a layer of the building material within the build area and a solidification device for selectively solidifying the applied layer at points corresponding to a cross-section of the object to be manufactured. The control unit is configured to control the manufacturing device such that it repeats the steps of applying and selectively solidifying until the object is completed, lets the solidification device and/or a compaction device further contained in the manufacturing device move behind the recoater in the recoating direction across the build area and performs a local action confined to a region between the recoater moving across the build area and the solidification device and/or compaction device moving behind the recoater across the build area on the applied layer of the building material. Thereby, for instance, the method according to the invention can be controlled by means of a control unit.

The manufacturing device according to the invention for generatively manufacturing a three-dimensional object by a layer-by-layer application and selective solidification of a building material comprises a recoater movable in a recoating direction across a build area for applying a layer of the building material within the build area and a solidification device for selectively solidifying the applied layer at points corresponding to a cross-section of the object to be manufactured. The manufacturing device is configured and/or controlled to repeat the steps of applying and selectively solidifying until the object is completed. The solidification device and/or a compaction device further contained in the manufacturing device are movably arranged behind the recoater in the recoating direction across the build area. The manufacturing device is configured and/or controlled to perform a local action confined to a region between the recoater moving across the build area and the solidification device and/or compaction device moving behind the recoater across the build area on the applied layer of the building material. Thereby, for instance, the method according to the invention can be performed by means of a manufacturing device.

Preferably, the solidification device is an irradiation device configured to emit a radiation suitable for solidifying the building material. Thereby, for instance, the energy required for solidifying the material can be introduced into the building material by means of radiation.

Preferably, the compaction device comprises a blade or roller suitable for compacting the applied layer of the building material. Thereby, for instance, the compaction of the layer can be implemented in a simple manner.

Preferably, the manufacturing device comprises an induction coil and/or a radiation heater arranged between the recoater and the solidification device and/or compaction device so as to be movable across the build area. Thereby, for instance, the local heating of the applied layer can be easily carried out.

Preferably, the manufacturing device comprises a pre-irradiation energy source arranged between the recoater and the solidification device and/or compaction device so as to be movable across the build area, for locally pre-irradiating the applied layer. Thereby, for instance, a first sintering-on or a chemical reaction can be effected in the building material.

BRIEF DESCRIPTION OF THE DRAWINGS

Further features and the usefulness of the invention will arise from the description of examples of embodiments on the basis of the accompanying drawings.

DETAILED DESCRIPTION OF THE EMBODIMENTS

Figure 1:
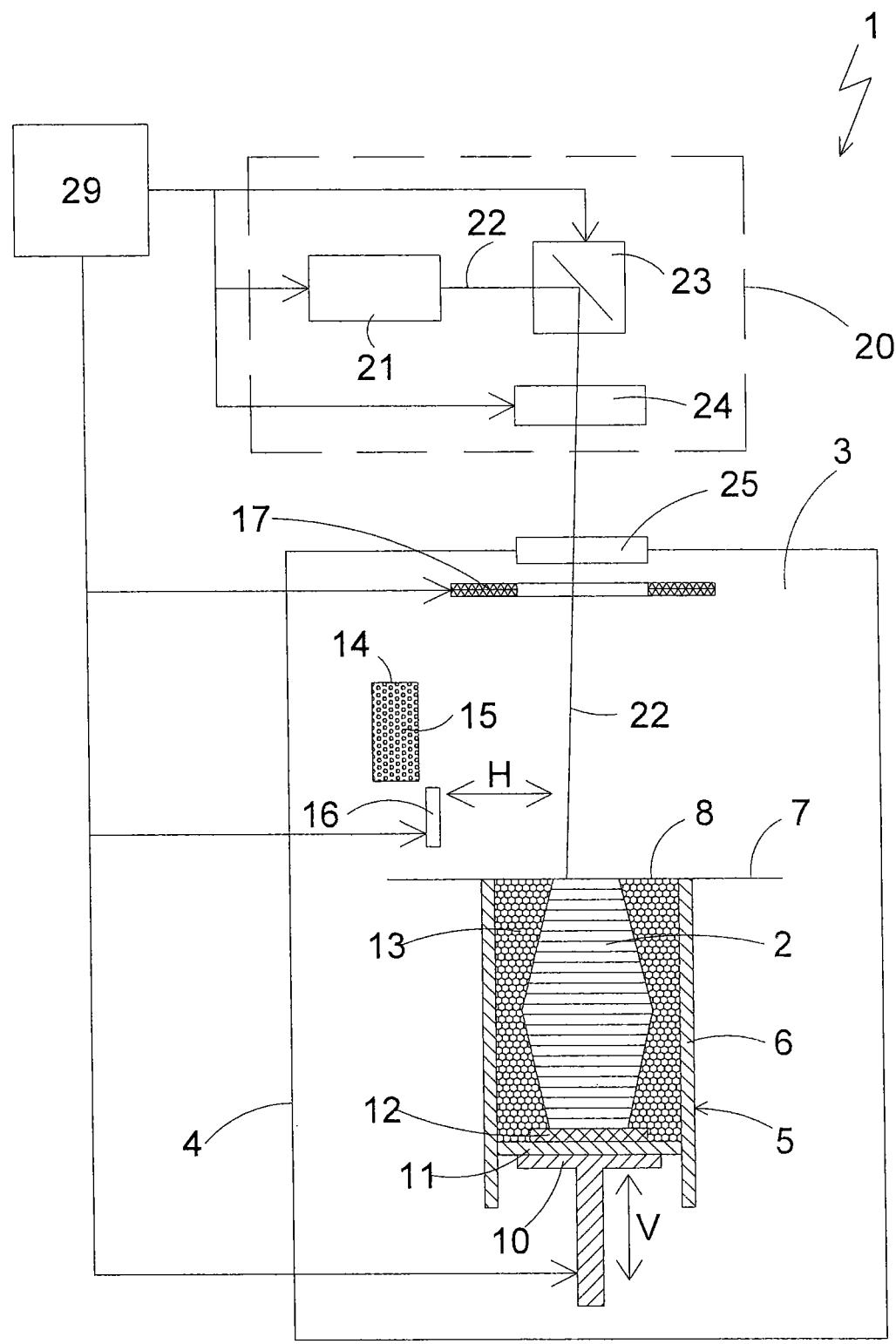
FIG. 1 is a schematic, partially cross-sectional view of a device for generatively manufacturing a three-dimensional object according to a first embodiment of the present invention.

In the following, a first embodiment of the present invention is described referring to FIGS. 1 and 2. The device shown in FIG. 1 is a laser sintering or laser melting device 1. For building up an object 2, it contains a process chamber 3 having a chamber wall 4.

In the process chamber 3, a container 5 open to the top and having a container wall 6 is arranged. By the upper opening of the container 5, a working plane 7 is defined, wherein the region of the working plane 7 lying within the opening which can be used for building up the object 2 is denoted as build area 8.

In the container 5, a support 10 movable in a vertical direction V is arranged at which a base plate 11 is mounted which closes the container 5 in a downward direction and thereby forms its bottom. The base plate 11 may be a plate formed separately from the support 10, which is attached to the support 10, or it may be integrally formed with the support 10. Depending on a powder used and a process, a building platform 12 as a building base on which the object 2 is built up may further be mounted on the base plate 11. However, the object 2 may also be built up on the base plate 11 itself, which then serves as a building base. In FIG. 1, the object 2 to be built in the container 5 on the building platform 12 is shown below the working plane 7 in an intermediate state having several solidified layers surrounded by building material 13 remaining non-solidified.

The laser sintering device 1 further contains a storage container 14 for a building material 15 in powder form which can be solidified by an electromagnetic radiation and a recoater 16 movable in a horizontal direction H for applying the building material 15 within the build area 8. Further, a global radiation heater 17 may be arranged in the process chamber which serves for heating the applied building material 15. The global radiation heater 17 is, for instance, formed as an infrared radiator.

The laser sintering device 1 further contains an irradiation device 20 having a laser 21 generating a laser beam 22 deflected via a deflecting device 23 and focused by a focusing device 24 via a coupling window 25, which is mounted at the upper side of the process chamber 3 in the chamber wall 4, onto the working plane 7.

The laser sintering device 1 further contains a control unit 29 via which the individual component parts of the device 1 are controlled in a coordinated manner for performing the building process. Alternatively, the control unit may also be mounted partially or completely outside the device. The control unit may contain a CPU whose operation is controlled by a computer program (software). The computer program may be stored separately from the device on a storage medium, from which it can be loaded into the device, in particular, into the control unit.

During operation, first, the support 10 is lowered for the application of a powder layer by a height corresponding to the desired layer thickness. The recoater 16, first, moves to the storage container 14 and receives from it an amount of the building material 15 sufficient for applying a layer. Then it moves across the build area 8 and applies there a thin layer of the building material 15 in powder form onto the building base 11, 12 or an already previously existing powder layer. The application is carried out at least across the total cross-section of the object 2 to be manufactured, preferably across the whole build area 8, i.e. the region confined by the container wall 6. Optionally, the building material 15 in powder form is subsequently heated by the global radiation heater 17. After a working temperature is reached, the cross-section of the object 2 to be manufactured is scanned by the laser beam 22, so that the building material 15 in powder form is solidified at the points corresponding to the cross-section of the object 2 to be manufactured. These steps are repeated as long as until the object 2 is completed and can be removed from the process chamber 3.

Figure 2:
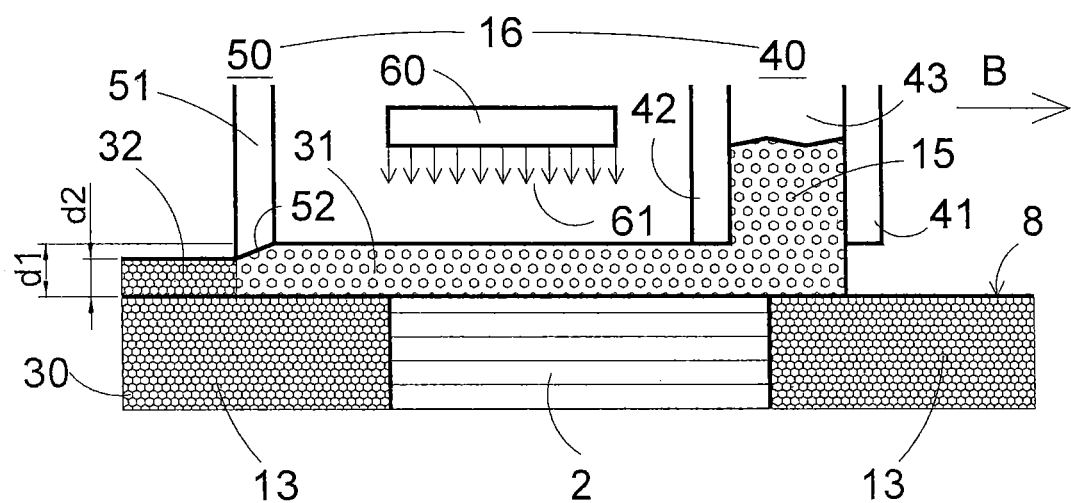
FIG. 2 shows a detail of the device shown in FIG. 1 during the application of a powder layer.

The process of the recoating is shown in FIG. 2 in more detail. In a powder bed 30 built up by preceding process steps, the solidified part of the object 2 to be manufactured is surrounded by powder 13 remaining non-solidified. A further powder layer of the building material 15 is then applied onto this powder bed 30 by means of a movement of the recoater 16 in a recoating direction B.

As shown in FIG. 2, the recoater 16 contains a recoating unit 40 having a recoater blade (front recoater blade 41) arranged at the front in the recoating direction B and a recoater blade (rear recoater blade 42) arranged at the rear in the recoating direction B. These two recoater blades extend transversely, preferably perpendicularly to the recoating direction B and at least partially close an interspace 43 in the recoating direction B and in the direction opposite to the recoating direction B. This interspace 43 confined by the two recoater blades 41, 42 is configured such as to receive a stock of building material 15 in powder form. When the recoater 14 is moved in the recoating direction B, a portion of this building material 13 in powder form remains on the powder bed 30 and is drawn out by the rear recoater blade 42 to a uniform thin powder layer 31 having a thickness d1. This thickness is determined by the distance of the lower edge of the rear recoater blade 42 from the powder bed 30.

The recoater 16 further contains a compaction unit 50 moving at a predetermined distance from the recoating unit 40 behind the same. In the present embodiment, the compaction unit 50 contains a compactor blade 51 extending transversely, preferably perpendicularly to the recoating direction B. The distance of the lower edge of the compactor blade 51 from the powder bed 30 is smaller than that of the lower edge of the rear recoater blade 42. Thereby, the layer thickness of the powder layer is getting reduced and the powder grains are getting compressed more densely. A compacted powder layer 32 having a thickness d2 which is less than the thickness d1 is generated.

For improving the compacting effect, the compactor blade 51 contains at its lower edge a compacting surface 52 rising in the recoating direction B. This compacting surface 52 can extend across the whole lower edge of the compactor blade 51 or only across a part of the lower edge of the compactor blade 51. The rise can be linear at a fixed angle, at a varying angle, or also following a curved line. When moving the compactor blade 51 across the newly applied layer 31 in the recoating direction B, this compacting surface 52 exerts a downward force component on the powder, whereby the powder grains are getting compressed and the powder layer is getting compacted.

Between the recoating unit 40 and the compaction unit 50, a local radiation heater 60 is arranged, being moved together with the recoating unit 40 and the compaction unit 50 in the recoating direction B. The local radiation heater 60 is, for instance, formed as an infrared radiator. This local radiation heater emits a heater radiation (e.g. infrared radiation) 61, which acts in a locally confined manner on the region between the recoating unit 40 and the compaction unit 50.

By this local heating of the powder layer by means of the local radiation heater 60 in addition to heating the whole build area by means of the global radiation heater 17, the desired working temperature can be reached more quickly. Besides, thereby, the newly applied powder layers can be heated more homogeneously and temperature differences within the applied powder layer can be reduced, which leads to a more stable process and, thus, to better mechanical properties of the manufactured object.

The local heating could also be performed behind the compaction unit alternatively to the above-described arrangement. However, the local heating in front of the compaction unit provides additional advantages: The powder grains expand due to the heating. Thereby, the layer thickness of the applied layer changes when a heating is performed after the compaction by means of a local radiation heater mounted behind the compaction unit and/or the global radiation heater, which could adversely influence the dimensional accuracy of the manufactured object. If, however, the powder is already getting pre-heated to an elevated temperature prior to the compaction, the subsequent expansion of the powder grains and the effect on the manufactured object resulting therefrom is much smaller. Therefore, the present embodiment is suitable for reliably ensuring a specified layer thickness.

Figure 3:
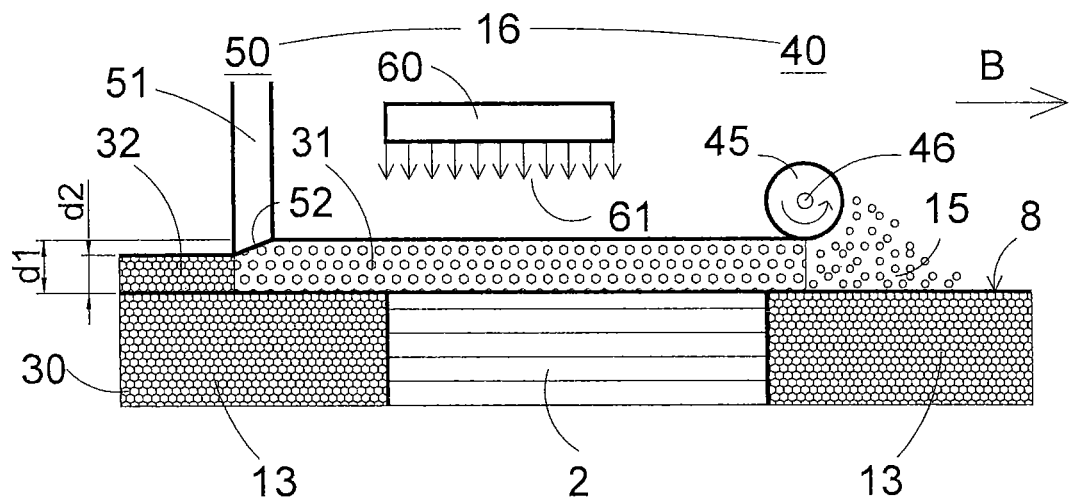
FIGS. 3 to 7 show a detail corresponding to FIG. 2 according to a second through sixth embodiment of the present invention.

FIG. 3 shows a second embodiment. In this embodiment, the recoating unit 40 contains a recoater roller 45 instead of the recoater blades 41, 42. Apart from that, the setup of this embodiment corresponds to that of the first embodiment.

The recoater roller 45 extends transversely, preferably perpendicularly to the recoating direction B and is mounted so as to be rotatable about its longitudinal axis 46. During the recoating process, the recoater roller 45 is driven such that it rotates in an opposite direction with respect to the recoating direction B (counter-clockwise in FIG. 3). This means that its rotating direction is opposite to the rotating direction of a roller which would roll off on a base in the recoating direction B.

Thereby, building material 15 in powder form which has been applied to the powder bed 30 in front of the recoater roller 45 or is pushed by the recoater roller 45 across the powder bed is being drawn out to a uniform thin powder layer 31 having a thickness d1, without getting compacted too much. This results in a particularly low-shearing and, thus, uniform layer application without internal stress. The thickness d1 is determined by the distance of the lower edge of the recoater roller 45 from the powder bed 30.

Also here, the distance of the lower edge of the compactor blade 51 from the powder bed 30 is smaller than that of the lower edge of the recoater roller 45, whereby also here a compacted powder layer 32 having a thickness d2 which is less than the thickness d1 is generated.

As in the first embodiment, a local radiation heater 60 is arranged between the recoating unit 40 and the compaction unit 50. Therefore, the same effects can be achieved with the second embodiment as with the first embodiment.

Figure 4:
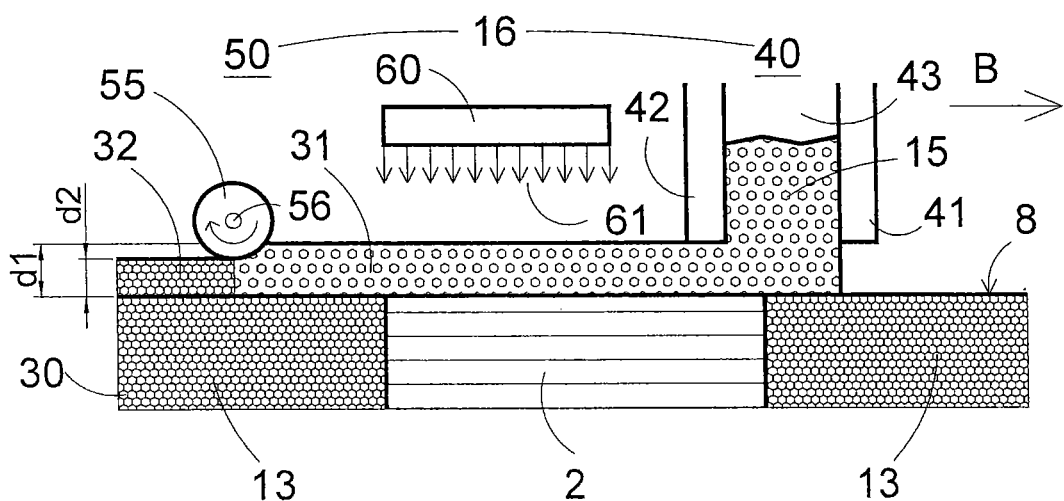

FIG. 4 shows a third embodiment. In this embodiment, the compaction unit 50 contains a compactor roller 55 instead of the compactor blade 51. Apart from that, the setup of this embodiment corresponds to that of the first embodiment.

The compactor roller 55 extends transversely, preferably perpendicularly to the recoating direction B and is mounted so as to be rotatable about its longitudinal axis 56. During the recoating process, the compactor roller 55 is at standstill or is preferably driven such that it rotates in the same direction with respect to the recoating direction B (clockwise in FIG. 4). This means that its rotating direction is the same as the rotating direction of a roller which would roll off on a base in the recoating direction B.

The distance of the lower edge of the compactor roller 55 from the powder bed 30 is smaller than that of the lower edge of the rear recoater blade 42. Thereby, while being moved across the newly applied layer 31 in the recoating direction B, the compactor roller 55 at standstill as well as, in fact to a larger extent, the compactor roller 55 driven in the same direction exerts a downward force component on the powder, whereby the powder grains are getting compressed and the powder layer is getting compacted. A compacted powder layer 32 having a thickness d2 which is less than the thickness d1 is generated. Thereby, also here a compacted powder layer 32 having a thickness d2 which is less than the thickness d1 is generated.

As in the first embodiment, a local radiation heater 60 is arranged between the recoating unit 40 and the compaction unit 50. Therefore, the same effects can be achieved with the third embodiment as with the first embodiment.

Figure 5:
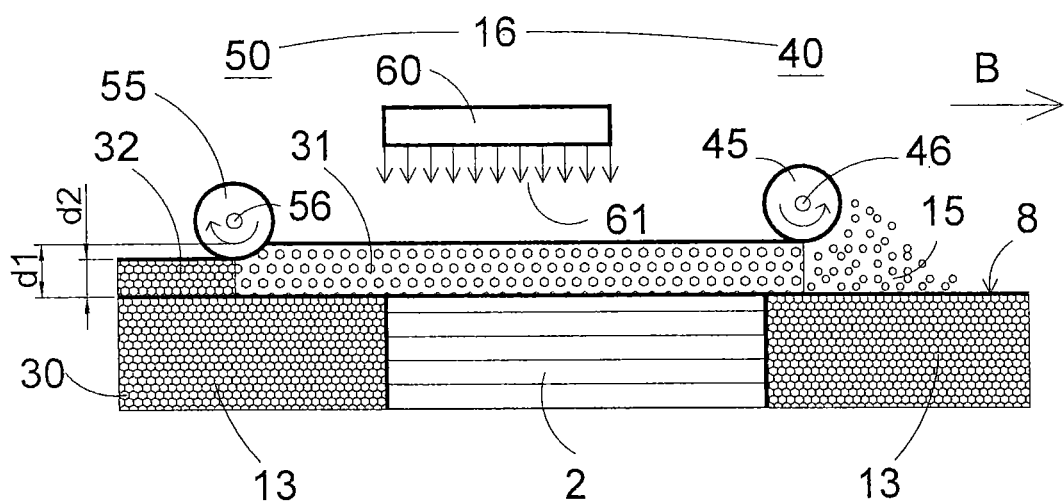

FIG. 5 shows a fourth embodiment. In this embodiment, the recoater blades 41, 42 are replaced by the recoater roller 45 of the second embodiment as well as the compactor blade 51 is replaced by the compactor roller 55 of the third embodiment. Apart from that, the setup of this embodiment corresponds to that of the first embodiment.

The distance of the lower edge of the compactor roller 55 from the powder bed 30 is smaller than that of the lower edge of the recoater roller 45. Thus, also here, compactor roller 55 generates from the powder layer 31 having the thickness d1 applied by the recoater roller 45 a compacted powder layer 32 having a thickness d2 which is less than the thickness d1.

As in the first embodiment, a local radiation heater 60 is arranged between the recoating unit 40 and the compaction unit 50. Therefore, the same effects can be achieved with the fourth embodiment as with the first embodiment.

Figure 6:
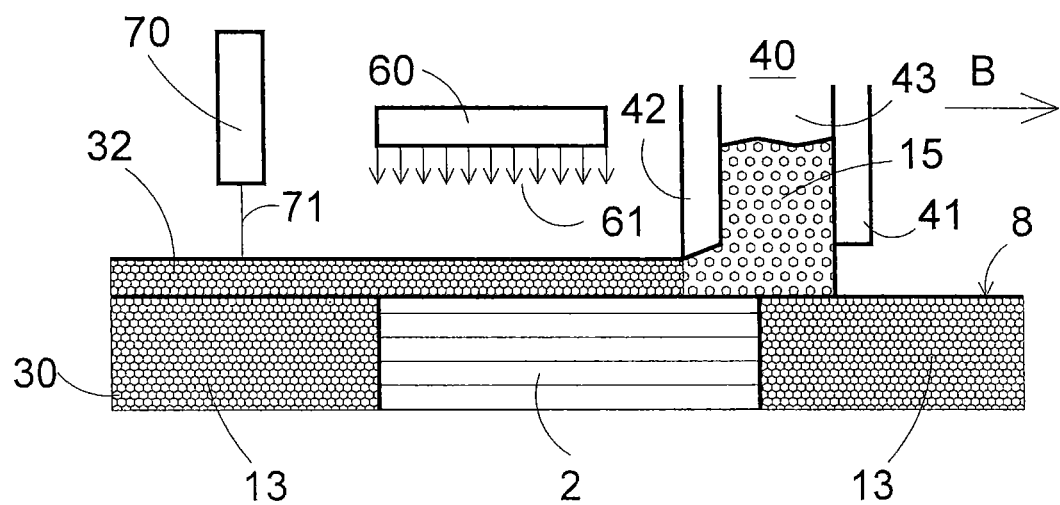

FIG. 6 shows a fifth embodiment. In this embodiment, the recoating unit 40, which is schematically depicted as a double blade similar to the first embodiment, executes both the function of applying a powder layer and the function of compacting the powder layer. To this end, for instance, the rear recoater blade 42 can be provided with a compacting surface similar to the compacting surface 52 of the compactor blade 51.

Here, instead of the compaction unit 50, an irradiation unit 70 moves at a predetermined distance behind the recoating unit. This irradiation unit 70 is provided alternatively or additionally to the irradiation unit 20 and generates a laser radiation 71 which is focused onto the working plane.

The irradiation unit 70 is preferably constructed as a line irradiator extending transversely, preferably perpendicularly to the recoating direction B and being capable of selectively irradiating a line extending in its longitudinal direction across the total width of the region to be irradiated.

For this irradiation, the amount of the energy introduced by the laser radiation 71 can be adjusted such that a complete solidification of the building material 15 in powder form takes place. However, also only a partial irradiation can be carried out, wherein the amount of the energy introduced by the laser radiation 71 is adjusted such that no complete solidification of the building material 15 in powder form takes place. The remaining energy required for the complete solidification of the powder is then introduced by the irradiation unit 20 after the recoating and the partial irradiation are completed.

In the course of this, the local radiation heater 60 provides for achieving the working temperature of the powder layer which is desired for the respective kind of irradiation, before the irradiation unit 70 moves across the powder layer.

Figure 7:
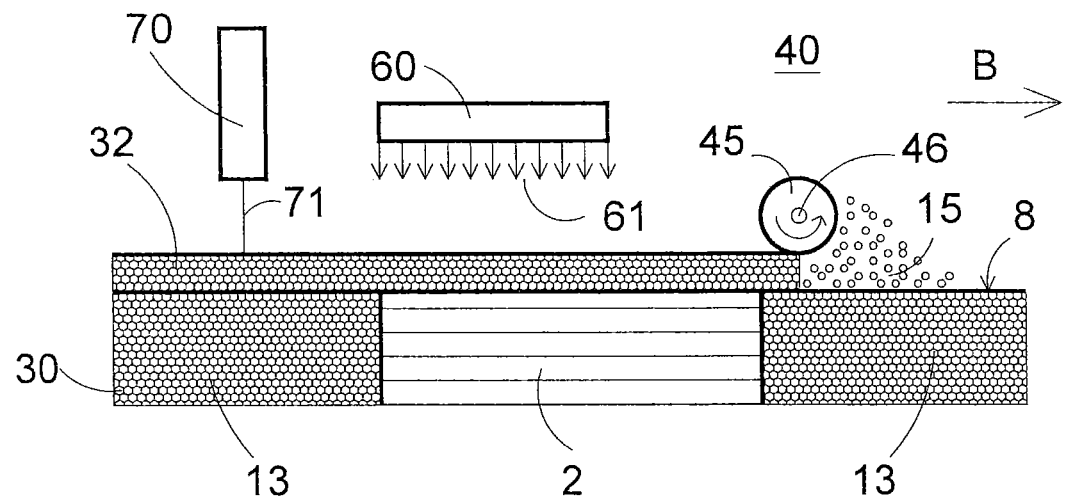

FIG. 7 shows a sixth embodiment. In this embodiment, the recoater blades 41, 42 are replaced by the recoater roller 45 of the second embodiment. Apart from that, the setup of this embodiment corresponds to that of the fifth embodiment.

As in the fifth embodiment, a local radiation heater 60 is arranged between the recoating unit 40 and the irradiation unit 70. Therefore, the same effects can be achieved with the sixth embodiment as with the fifth embodiment.

The features of the above-described embodiments can, where possible, be combined with each other and modified. For instance, both a compaction unit and an irradiation unit can move behind the recoating unit, and a locally confined action on the applied powder layer can be performed between these units.

Instead of the double blade or recoater roller serving for applying the powder layer, any arbitrary recoating element may be used which is suitable for applying a powder layer, for instance, also a single blade or a scraper.

Independently of the type of the recoating element used, the application of the powder layer can comprise drawing out the applied building material to a thin, preferably uniform powder layer and/or smoothing the surface of the powder layer. In the generative manufacturing methods mentioned at the outset, a thickness of an individual building material layer is typically less than 1 mm, e.g. 100 µm. The powder layer can purposefully be shaped such that it e.g. has a substantially constant thickness, or continuously becomes thicker or thinner at a predetermined slope, or follows another predetermined height profile, for instance, defined by mathematical specifications. In the course of this, the shape of an individual layer can vary depending on a relief of the substrate, e.g. in the case of solidified and non-solidified points in the subjacent powder material layer. This application of a powder layer, thus, goes beyond the mere application of building material by means of a dosing feeder which lets the powder trickle onto the build area in an uncontrolled manner. Such a dosing feeder may be provided upstream of the actual recoater, so that the recoater does not perform the functions of receiving and transporting the building material anymore, but these are provided by the dosing feeder.

Instead of the compactor blade or compactor roller serving for compacting the applied powder layer, any arbitrary compaction element suitable for compacting a powder layer can be used, for instance, also a scraper.

Instead of the irradiation device serving for solidifying the applied powder layer, any arbitrary solidification device suitable for solidifying a powder layer can be used, for instance, also a source of a particle beam or an application device for an adhesive.

Instead of the local radiation heater for locally heating the applied powder layer, also a different heating device acting locally can be used, for instance, an induction coil for inductively heating the powder layer.

However, a local action on the powder layer confined to the region between the recoating unit and the compaction unit and/or solidification unit can also be carried out in a different manner than by heating.

For instance, the locally confined action on the applied layer of the building material can comprise charging the layer with a fluid at least surface-actively interacting with the building material or with at least one constituent of the building material. This fluid can be a gas and/or a liquid. By being introduced prior to the compaction into the powder layer which is then still more loose, it can permeate the powder layer better than after the compaction.

The locally confined action on the applied layer of the building material can, for instance, also comprise introducing an absorbing agent and/or an inhibiting agent into the building material layer. Thereby, the absorption of radiation is increased by the absorbing agent or, respectively, reduced by the inhibiting agent at the corresponding points. The absorbing agent and/or inhibiting agent can be liquid, solid, or paste-like and be applied to a full surface or selectively. With a selective application, a selective region of the powder layer can be solidified also using a non-selective irradiation. By the subsequent compaction, the absorbing agent and/or inhibiting agent can be forced into the powder more firmly and thus better adhere to its surface. Alternatively, hollow particles, for instance hollow spheres, filled with a liquid absorbing agent and/or inhibiting agent can be applied and destroyed by the subsequent compaction, so that thus high amounts of absorbing agent and/or inhibiting agent can be selectively introduced into the powder layer very well. The local introduction of an absorbing agent and/or an inhibiting agent between a recoating unit and an irradiation unit moving behind it can be carried out also without a subsequent compaction, which can be then, for instance, non-selectively irradiated.

Instead of applying further constituents, the locally confined action on the applied layer of the building material can, for instance, also comprise an at least partial removal of at least one constituent of the building material layer. Thereby, specific compounds can escape from the powder prior to the compaction, for instance, residual monomers and/or moisture. However, instead of a powder, also a paste-like material composed of powder and a liquid as a suspending agent or solvent could be applied during the recoating, and the suspending agent or solvent be removed prior to compacting and/or irradiating. Thereby, also extremely fine powders could be applied, which would not be pourable as powder alone and, thus, could not be applied as a powder layer.

The locally confined action on the applied layer of the building material can, for instance, also comprise a local pre-irradiation. Between recoating and a subsequent compaction and/or irradiation, an irradiation with a laser and/or electron beam could be carried out at a full surface or selectively, which causes a modification in the applied powder. This could, for instance, be a thermal reaction, e.g. a first sintering-on and/or fusing or also just coupling, in order that nothing is shifted during the subsequent compaction. However, it could also be chemical reactions causing a modification in the powder. One example of this are laser-active pigments changing their absorption coefficient when irradiated with a specific wave length and e.g. becoming black. Thus, an areal or selective modification of the absorption coefficient would be possible. This would be advantageously performed prior to compacting the powder, since the laser can penetrate the powder more deeply due to the lower packaging density and, thus, an activation in a more homogeneous manner would be possible.

Also combinations of these and other possibilities of local action may be implemented.

When the recoating unit is designed such that it allows a recoating in two directions, as is, for instance, the case with the recoating unit shown in FIG. 2 having the double blade, a compaction device and/or solidification device moving across the build area can also be arranged one each on both sides and a locally confined action on the newly applied powder layer be carried out depending on the recoating direction of the recoating unit and the compaction device and/or solidification device following it.

Even though the present invention has been described on the basis of a laser sintering or, respectively, laser melting device, it is not limited to the laser sintering or laser melting. It may be applied to arbitrary methods of generatively manufacturing a three-dimensional object by a layer-by-layer application and selective solidification of a building material.

The irradiator may, for instance, comprise one or more gas or solid state lasers or any other type of lasers, such as e.g. laser diodes, in particular VCSEL (Vertical Cavity Surface Emitting Laser) or VECSEL (Vertical External Cavity Surface Emitting Laser), or a line of these lasers. Generally, any device by means of which energy can be selectively applied to a layer of the building material as wave or particle radiation may be used as irradiator. Instead of a laser, for instance, another light source, an electron beam, or any other energy or, respectively, radiation source may be used which is suitable for solidifying the building material. Instead of deflecting a beam, also the irradiating using a movable line irradiator may be applied. The invention may also be applied to the selective mask sintering, where an extended light source and a mask are used, or to the High-Speed-Sintering (HSS), where a material enhancing (absorption sintering) or reducing (inhibition sintering) the absorption of radiation at the corresponding points is selectively applied onto the building material, and then an irradiation is performed non-selectively in a large-area manner or using a movable line irradiator.

Instead of supplying energy, the selective solidification of the applied building material may also be performed by 3D printing, for instance, by applying an adhesive. Generally, the invention relates to generatively manufacturing an object by means of a layer-by-layer application and selective solidification of a building material, independently of the manner in which the building material is being solidified.

As building material, various materials may be used, preferably powder, in particular, metal powder, plastic powder, ceramic powder, sand, filled or mixed powders.

The invention claimed is:

1. A manufacturing method for generatively manufacturing a three-dimensional object by a layer-by-layer application and selective solidification of a building material, comprising the steps of:

applying a layer of the building material within a build area using a recoater moving in a recoating direction across the build area;

selectively solidifying the applied layer of the building material at points corresponding to a cross-section of the object to be manufactured using solidification device;

repeating the steps of applying and solidifying until the three-dimensional object is completed;

moving a compaction device behind a recoating unit of the recoater in the recoating direction across the build area, wherein a lower edge of the compaction device is closer to the build area than a lower edge of the recoater to effect compaction of an applied building material layer by the compaction device; and performing a local action confined to a region between the recoating unit moving across the build area and the compaction device moving behind the recoating unit across the build area on the applied layer of the building material, wherein the locally confined action on the applied layer of the building material comprises introducing an absorbing agent and/or an inhibiting agent into the building material layer, and/or wherein the locally confined action on the applied layer of the building material comprises pre-irradiating using a laser or an electron beam and/or wherein the locally confined action on the applied layer of the building material comprises charging the layer with a fluid at least surface-actively interacting with at least one constituent of the building material and/or wherein the locally confined action on the applied layer of the building material comprises at least partially removing at least one constituent of the building material layer.

2. The manufacturing method according to claim 1, wherein applying the layer of the building material using the recoater comprises drawing out the applied building material to a layer according to predetermined criteria concerning an areal extent and/or thickness and/or surface property and/or density of the layer.

3. The manufacturing method according to claim 1, wherein
the locally confined action on the applied layer of the building material comprises a local heating, wherein the local heating is carried out by induction and/or radiation.

4. The manufacturing method according to claim 1, wherein the locally confined action on the applied layer of the building material comprises introducing an absorbing agent and/or an inhibiting agent into the building material layer and the absorbing agent and/or inhibiting agent is liquid, paste-like, and/or solid and/or contains hollow particles filled with a liquid or paste.

5. A computer program loadable into a programmable control unit and having program code means to perform all steps of a method for generatively manufacturing a three-dimensional object by a layer-by-layer application and selective solidification of a building material when the computer program is executed in the control unit, the program comprising the following steps:
applying a layer of the building material within a build area using a recoater moving in a recoating direction across the build area;
selectively solidifying the applied layer of the building material at points corresponding to a cross-section of the object to be manufactured using a solidification device;
repeating the steps of applying and solidifying until the three-dimensional object is completed;
moving a compaction device behind a recoating unit of the recoater in the recoating direction across the build area, wherein a lower edge of the compaction device is closer to the build area than a lower edge of the recoater to effect compaction of an applied building material layer by the compaction device; and
performing a local action confined to a region between the recoating unit moving across the build area and the compaction device moving behind the recoating unit across the build area on the applied layer of the building material,
wherein the locally confined action on the applied layer of the building material comprises introducing an absorbing agent and/or an inhibiting agent into the building material layer, and/or wherein the locally confined action on the applied layer of the building material comprises pre-irradiating using a laser or an electron beam and/or wherein the locally confined action on the applied layer of the building material comprises charging the layer with a fluid at least surface-actively interacting with at least one constituent of the building material and/or wherein the locally confined action on the applied layer of the building material comprises at least partially removing at least one constituent of the building material layer.

6. A control device for a manufacturing device for generatively manufacturing a three-dimensional object by a layer-by-layer application and selective solidification of a building material, wherein the manufacturing device comprises:
a recoater movable in a recoating direction across a build area for applying a layer of the building material within the build area; and
a solidification device for selectively solidifying the applied layer at points corresponding to a cross-section of the object to be manufactured,
wherein the control unit is configured to control the manufacturing device such that the manufacturing device:
repeats the steps of applying and selectively solidifying until the object is completed;
allows a compaction device further contained in the manufacturing device to move behind a recoating unit of the recoater in the recoating direction across the build area, wherein a lower edge of the compaction device is closer to the build area than a lower edge of the recoater to effect compaction of an applied building material layer by the compaction device; and
performs a local action confined to a region between the recoating unit moving across the build area and the compaction device moving behind the recoating unit across the build area on the applied layer of the building material,
wherein the locally confined action on the applied layer of the building material comprises introducing an absorbing agent and/or an inhibiting agent into the building material layer, and/or wherein the locally confined action on the applied layer of the building material comprises pre-irradiating using a laser or an electron beam and/or wherein the locally confined action on the applied layer of the building material comprises charging the layer with a fluid at least surface-actively interacting with at least one constituent of the building material and/or wherein the locally confined action on the applied layer of the building material comprises at least partially removing at least one constituent of the building material layer.

7. A manufacturing device for generatively manufacturing a three-dimensional object by a layer-by-layer application and selective solidification of a building material, comprising:
a recoater movable in a recoating direction across a build area for applying a layer of the building material within the build area; and
a solidification device for selectively solidifying the applied layer at points corresponding to a cross-section of the object to be manufactured,
wherein:
the manufacturing device is configured and/or controlled to repeat the steps of applying and selectively solidifying until the object is completed;
a compaction device further contained in the manufacturing device and that is movably arranged behind a recoating unit of the recoater in the recoating direction across the build area, wherein a lower edge of the compaction device is closer to the build area than a lower edge of the recoater to effect compaction of an applied building material layer by the compaction device,
the manufacturing device is configured and/or controlled to perform a local action confined to a region between the recoating unit moving across the build area and the compaction device moving behind the recoating unit across the build area on the applied layer of the building material;

the locally confined action on the applied layer of the building material comprises introducing an absorbing agent and/or an inhibiting agent into the building material layer, and/or wherein the locally confined action on the applied layer of the building material comprises pre-irradiating using a laser or an electron beam and/or wherein the locally confined action on the applied layer of the building material comprises charging the layer with a fluid at least surface-actively interacting with at least one constituent of the building material and/or wherein the locally confined action on the applied layer of the building material comprises at least partially removing at least one constituent of the building material layer.

8. The manufacturing device according to claim 7, wherein the solidification device is an irradiation device configured to emit a radiation suitable for solidifying the building material.

9. The manufacturing device according to claim 7, wherein the compaction device comprises a blade or roller suitable for compacting the applied layer of the building material.

10. The manufacturing device according to claim 7, further comprising an induction coil and/or a radiation heater arranged between the recoating unit and the compaction device so as to be movable across the build area, for locally heating the applied layer of the building material.

11. The manufacturing device according to claim 7, further comprising a pre-irradiation energy source arranged between the recoating unit and the compaction device so as to be movable across the build area, for locally pre-irradiating the applied layer of the building material.

12. A manufacturing method for generatively manufacturing a three-dimensional object by a layer-by-layer application and selective solidification of a building material, comprising the steps of:

applying a layer of the building material within a build area using a recoater moving in a recoating direction across the build area;

selectively solidifying the applied layer of the building material at points corresponding to a cross-section of the object to be manufactured by an irradiation device moving behind a recoating unit of the recoater in the recoating direction across the build area, wherein the irradiation device is a line irradiation device extending transversely to the recoating direction and selectively irradiating a line extending in a longitudinal direction of the line across the total width of the region to be irradiated, and the irradiation device comprises several Vertical Cavity Surface Emitting Lasers (VCSEL) or Vertical External Cavity Surface Emitting Lasers (VECSEL);

repeating the steps of applying and solidifying until the three-dimensional object is completed; and performing a local action confined to a region between the recoating unit moving across the build area and the irradiation device moving behind the recoating unit across the build area on the applied layer of the building material, wherein the locally confined action on the applied layer of the building material comprises a local heating and/or pre-irradiating and/or comprises at least partially removing at least one constituent of the building material layer.

13. The manufacturing method according to claim 12, wherein applying the layer of the building material by the recoater comprises drawing out the applied building material to a layer according to predetermined criteria concerning an areal extent and/or thickness and/or surface property and/or density of the layer.

14. The manufacturing method according to claim 12, wherein the locally confined action on the applied layer of the building material comprises a local heating and the local heating is carried out by induction and/or radiation.

15. A computer program loadable into a programmable control unit and having program code means in order to perform all steps of a method for generatively manufacturing a three-dimensional object by a layer-by-layer application and selective solidification of a building material when the computer program is executed in the control unit, the method comprising the steps of:

applying a layer of the building material within a build area using a recoater moving in a recoating direction across the build area;

selectively solidifying the applied layer of the building material at points corresponding to a cross-section of the object to be manufactured by means of an irradiation device moving behind a recoating unit of the recoater in the recoating direction across the build area, wherein the irradiation device is a line irradiation device extending transversely to the recoating direction and selectively irradiating a line extending in a longitudinal direction of the line across the total width of the region to be irradiated, and the irradiation device comprises several Vertical Cavity Surface Emitting Lasers (VCSEL) or Vertical External Cavity Surface Emitting Lasers (VECSEL); and repeating the steps of applying and solidifying until the three-dimensional object is completed; and performing a local action confined to a region between the recoating unit moving across the build area and the irradiation device moving behind the recoating unit across the build area on the applied layer of the building material, wherein the locally confined action on the applied layer of the building material comprises a local heating and/or pre-irradiating and/or comprises at least partially removing at least one constituent of the building material layer.

16. A control unit for a manufacturing device for generatively manufacturing a three-dimensional object by a layer-by-layer application and selective solidification of a building material, wherein the manufacturing device comprises:

a recoater movable in a recoating direction across a build area for applying a layer of the building material within the build area; and an irradiation device being movable behind a recoating unit of the recoater in the recoating direction across the build area for selectively solidifying the applied layer at points corresponding to a cross-section of the object to be manufactured, wherein the irradiation device is a line irradiation device extending transversely to the recoating direction and selectively irradiating a line extending in a longitudinal direction of the line across the total width of the region to be irradiated, and the irradiation device comprises several Vertical Cavity Surface Emitting Lasers (VCSEL) or Vertical External Cavity Surface Emitting Lasers (VECSEL), wherein the control unit is configured to control the manufacturing device such that the control unit:

repeats the steps of applying and selectively solidifying until the object is completed; and performs a local action confined to a region between the recoating unit moving across the build area and the irradiation device moving behind the recoating unit across the build area on the applied layer of the building material, wherein the locally confined action on the applied layer of the building material comprises a local heating and/or pre-irradiating and/or comprises at least partially removing at least one constituent of the building material layer.

17. A manufacturing device for generatively manufacturing a three-dimensional object by a layer-by-layer application and selective solidification of a building material, comprising:

a recoater movable in a recoating direction across a build area for applying a layer of the building material within the build area; and an irradiation device being movable behind a recoating unit of the recoater in the recoating direction across the build area for selectively solidifying the applied layer at points corresponding to a cross-section of the object to be manufactured, wherein the irradiation device is a line irradiation device extending transversely to the recoating direction and selectively irradiating a line extending in a longitudinal direction of the line across the total width of the region to be irradiated, and the irradiation device comprises several Vertical Cavity Surface Emitting Lasers (VCSEL) or Vertical External Cavity Surface Emitting Lasers (VECSEL), wherein:
the manufacturing device is configured and/or controlled to repeat the steps of applying and selectively solidifying until the object is completed;
the manufacturing device is configured and/or controlled to perform a local action confined to a region between the recoating unit moving across the build area and the irradiation device moving behind the recoating unit across the build area on the applied layer of the building material; and
the locally confined action on the applied layer of the building material comprises a local heating and/or pre-irradiating and/or comprises at least partially removing at least one constituent of the building material layer.

18. The manufacturing device according to claim 17, wherein the irradiation device is configured to emit a radiation suitable for solidifying the building material.

19. The manufacturing device according to claim 17, further comprising a compaction device movable across the build area behind the recoating unit of the recoater, the compaction device comprising a blade or roller suitable for compacting the applied layer of the building material.

20. The manufacturing device according to claim 17, comprising an induction coil and/or a radiation heater arranged between the recoating unit and the irradiation device so as to be movable across the build area, for locally heating the applied layer of the building material.

21. The manufacturing device according to claim 17, comprising a pre-irradiation energy source arranged between the recoating unit and the irradiation device so as to be movable across the build area, for locally pre-irradiating the applied layer of the building material.

* * * * *